(12) United States Patent
Goulas et al.

(10) Patent No.: US 12,454,605 B2
(45) Date of Patent: Oct. 28, 2025

(54) METHOD FOR RECYCLING POLYVINYL CHLORIDE (PVC) TO PRODUCE HIGH DENSITY POLYETHYLENE (HDPE)

(71) Applicants: Konstantinos Goulas, Corvallis, OR (US); Scott Svadlenak, Corvallis, OR (US)

(72) Inventors: Konstantinos Goulas, Corvallis, OR (US); Scott Svadlenak, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 694 days.

(21) Appl. No.: 17/861,454

(22) Filed: Jul. 11, 2022

(65) Prior Publication Data

US 2023/0012030 A1    Jan. 12, 2023

Related U.S. Application Data

(60) Provisional application No. 63/220,849, filed on Jul. 12, 2021.

(51) Int. Cl.
*C08J 11/16* (2006.01)
*C08F 8/26* (2006.01)
*C08F 10/02* (2006.01)

(52) U.S. Cl.
CPC ............... *C08J 11/16* (2013.01); *C08F 8/26* (2013.01); *C08F 10/02* (2013.01); *C08J 2327/06* (2013.01)

(58) Field of Classification Search
CPC ... C08F 8/04; C08F 8/26; C08F 114/06; C08J 11/04; C08J 11/14–16; C08J 2327/06
See application file for complete search history.

(56) References Cited

U.S. PATENT DOCUMENTS 10,442,997 B2    10/2019   Narayanaswamy et al.
2022/0033541 A1*  2/2022   Bara ..................... B01J 23/44

OTHER PUBLICATIONS

Gong, S. Hydrodechlorination of Polyvinyl Chloride in Sub-critical Water. Thesis. McGill University. Nov. 2005. (Year: 2005).*
Weiss, A. H. et al. Hydrodechlorination Kinetic and Reaction Mechanisms. Journal of Catalysis, 1966, 6, 167-185. (Year: 1966).*
Zakharyan et al. Pathways of Chemical Recycling of Polyvinyl Chloride: Part 1. Russian Journal of Applied Chemistry, 2020, 93, 1271-1313. (Year: 2020).*
Zakharyan et al. Pathways of Chemical Recycling of Polyvinyl Chloride: Part 2. Russian Journal of Applied Chemistry, 2020, 93, 1445-1490. (Year: 2020).*
Smith et al. The Catalytic Hydrogenation of the Benzene Nucleus. I. The Hydrogenation of Phenyl-substituted Aliphatic Acids. Journal of the American Chemical Society, 1945, 67, 272-276. (Year: 1945).*
Keane, "Catalytic conversion of waste plastics: focus on waste PVC," *Journal of Chemical Technology and Biotechnology* 82:787-795, 2007, published online Jul. 30, 2007.
McGrath et al., "Functionalization of Polymers by Metal-Mediated Processes," *Chemical Reviews* 95(2):381-398, 1995.
Poerschmann et al., "Hydrothermal carbonization of poly(vinyl chloride)," *Chemosphere* 119:682-689, 2015, available online Aug. 24, 2014.

* cited by examiner

*Primary Examiner* — Stephen E Rieth
(74) *Attorney, Agent, or Firm* — Klarquist Sparkman, LLP

(57) ABSTRACT

Disclosed herein is a process to convert PVC plastic into a dechlorinated polymer, such as high density polyethylene, while substantially avoiding carbonization. The process also facilitates Cl recovery and/or reintroducing the dechlorinated plastic into product streams. In some embodiments, the process comprises heating a mixture of PVC and a catalyst and/or a base in a solvent, optionally in the presence of hydrogen gas.

17 Claims, 7 Drawing Sheets

| Temperature °C | Pressure (PSI) | Time (hr) | Catalyst type (5 wt % load on carbon) | Catalyst : PVC mass ratio | Base type | Base $K_{ow}$ | Base : PVC N : Cl mol ratio | % Yield (J/g) |
|---|---|---|---|---|---|---|---|---|
| 200 | 80 | 24 | Pt | 1:5 | Triethylamine | 1.45 | 2:1 | 7 |
| 200 | 80 | 24 | Pt | 1:5 | Butylamine | 0.86 | 2:1 | 8 |
| 200 | 80 | 24 | Pt | 1:5 | Ammonia | -0.7 | 2:1 | 3 |
| 200 | 80 | 24 | Pt | 1:5 | N-methyl-N-octylamine | 3.7 | 2:1 | 25 |
| 200 | 80 | 24 | Pt | 1:5 | Benzylamine | 1.09 | 2:1 | 17 |
| 200 | 80 | 24 | Pt | 1:5 | N,N- dimethyl octylamine | 4.2 | 2:1 | 50 |
| 200 | 80 | 24 | Pt | 1:5 | N,N- dimethyl hexylamine | 2.6 | 2:1 | 49 |
| 200 | 80 | 24 | Pt | 1:5 | N,N-dimethylbutylamine | 1.7 | 2:1 | 33 |
| 200 | 80 | 24 | Pt | 1:5 | Trihexylamine | 7.3 | 2:1 | 71 |
| 200 | 80 | 24 | Pt | 1:5 | Hexylamine | 2.06 | 2:1 | 35 |
| 200 | 80 | 24 | Pt | 1:5 | Octylamine | 3.09 | 2:1 | 90 |
| 75 | 80 | 24 | Pt | 1:5 | Hexylamine | 2.06 | 2:1 | 7 |
| 125 | 80 | 24 | Pt | 1:5 | Hexylamine | 2.06 | 2:1 | 74 |
| 175 | 80 | 24 | Pt | 1:5 | Hexylamine | 2.06 | 2:1 | 42 |
| 75 | 80 | 24 | Pt | 1:5 | Octylamine | 3.09 | 2:1 | 11 |
| 200 | 40 | 24 | Pt | 1:5 | Hexylamine | 2.06 | 2:1 | 99 |
| 200 | 80 | 24 | Pt | 1:100 | N,N-dimethylhexylamine | 2.6 | 2:1 | 2 |
| 200 | 80 | 24 | Pt | 1:3 | N,N-dimethylhexylamine | 2.6 | 2:1 | 85 |
| 200 | 80 | 0.5 | Pt | 1:5 | Triethylamine | 1.45 | 2:1 | 2 |
| 200 | 80 | 2 | Pt | 1:5 | Triethylamine | 1.45 | 2:1 | 2 |
| 200 | 80 | 4 | Pt | 1:5 | Triethylamine | 1.45 | 2:1 | 3 |
| 200 | 80 | 24 | No catalyst | 0 | Triethylamine | 1.45 | 2:1 | 0 |
| 200 | No H$_2$ | 24 | Pt | 1:5 | Triethylamine | 1.45 | 2:1 | 16 |
| 200 | 80 | 24 | Pt | 1:5 | N,N-dimethylhexylamine | 2.6 | 1:1 | 95 |
| 200 | 80 | 24 | No catalyst | 0 | Trihexylamine | 7.3 | 2:1 | 68 |
| 50 | 80 | 24 | Pt | 1:5 | N,N-Dimethylhexylamine | 2.6 | 2:1 | 0 |
| 200 | 80 | 4 | Pt | 1:5 | N,N-Dimethylhexylamine and Trihexylamine | 2.6 and 7.3 | 2:1 | 23 |

FIG. 6

| Temperature °C | H$_2$ Pressure (PSI) | Time (hr) | Catalyst type | Catalyst : PVC mass ratio | Base type | Base concentration (M) | % Yield (J/g) |
|---|---|---|---|---|---|---|---|
| 200 | 60 | 24 | Pd/C | 1:5 | KOH | 2.5 | 0.622 |
| 200 | 60 | 24 | Pt/C | 1:5 | KOH | 2.5 | 0.199 |
| 200 | 60 | 24 | Ru/C | 1:5 | KOH | 2.5 | 0.267 |
| 200 | 60 | 24 | Ni(dppe)Cl$_2$ | 1:5 | KOH | 2.5 | 0.416 |
| 200 | 60 | 24 | Pd/C | 1:5 | none | 0 | 0.692 |
| 200 | 60 | 24 | None | 0 | KOH | 2.5 | 0.236 |
| 200 | 0 | 24 | Pd/C | 1:5 | KOH | 2.5 | 0.249 |

METHOD FOR RECYCLING POLYVINYL CHLORIDE (PVC) TO PRODUCE HIGH DENSITY POLYETHYLENE (HDPE)

CROSS REFERENCE TO RELATED APPLICATION

This application claims the benefit of the earlier filing date of U.S. provisional patent application No. 63/220,849, filed on Jul. 12, 2021, which is incorporated herein by reference in its entirety.

FIELD

This disclosure concerns a method for recycling polyvinyl chloride (PVC) to produce a re-useable chlorine-free polymer.

BACKGROUND

Polyvinyl chloride (PVC) is the world's third-most widely produced synthetic plastic polymer. Approximately 40 million tons of PVC are produced each year and worldwide production drastically outweighs the amount that has been recycled or otherwise reused. For example, of the approximately 200 million metric tons of PVC produced in Europe between 1960 and 2012, only approximately 1% was fully recycled. Waste materials that contain PVC are incredibly difficult to recycle mechanically. Meanwhile, thermochemical methods such as pyrolysis are undesirable chemical pathways because of the HCl and chlorinated organic compounds that may be produced by the thermal decomposition of PVC.

SUMMARY

Disclosed here is a method comprising mixing polyvinylchloride (PVC) with a solvent and either a catalyst, a base, or a catalyst and a base, to form a first mixture. The first mixture is then heated, optionally in the presence of hydrogen gas, to form a second mixture comprising polyethylene. In some embodiments, the first mixture comprises the catalyst and the base. In other embodiments, the first mixture comprises the catalyst and the base, and the first mixture is heated in the presence of hydrogen gas. The solvent can be any suitable solvent, and may comprise water, one or more organic solvents selected from an alcohol, THF, pyridine, dimethylformamide, or triethylamine, or a combination of water and an organic solvent.

In some embodiments, the first mixture comprises a base selected from an inorganic base, an organic base, or a combination thereof. The inorganic base may comprise a hydroxide base, and/or the organic base may comprise an alkylamine, dialkylamine, trialkylamine, or a combination thereof. In some embodiments, the base is triethylamine, N,N-diisopropylethylamine, diethylamine, N,N-dimethylhexylamine, trihexylamine, octylamine, trioctylamine, or a combination thereof. In any embodiments, the base has a base concentration in the solvent of from greater than zero to 10 M.

In some embodiments, the catalyst is an inorganic catalyst, and may comprise Ni, Ru, Pd, Pt, Rh or a combination thereof. In some embodiments, the catalyst has a catalyst loading on a catalyst support of from 0.1 wt % to 65 wt %. In certain embodiments, the catalyst is Ni, Ru, Pd/C, Pt/C, Rh, Pd(OH)$_2$, PtO$_2$, wilkinson's catalyst (chloridotris(triphenylphosphine)rhodium(I)), RhCl(TPPMS)$_3$ (where TPPMS=monosulfonated triphenylphosphane), RhCl(TPPTS)$_3$ (where TPPTS=trisulfonated triphenylphosphane), dichloro(1,2-bis(diphenylphosphino)ethane)nickel (Ni(dppe)Cl$_2$), or a combination thereof. In particular embodiments, the catalyst is 5 wt % Pd on carbon or 5 wt % Pt on carbon, and in some such embodiments, the base comprises an alkylamine, dialkylamine, trialkylamine, or a combination thereof. In any embodiments, a ratio of PVC to catalyst in the first mixture is from 1000:1 to 1:5 (PVC:catalyst), such as from 20:1 to 2.5:1.

The hydrogen gas may have a hydrogen gas pressure of from greater than zero to 350 PSI, such as from 50 PSI to 150 PSI.

In some embodiments, heating the first mixture comprises heating the first mixture to a temperature of from 30° C. to 350° C., such as from 50° C. to 350° C., or from 75° C. to 250° C. And/or heating the first mixture may comprise heating the first mixture for a time period of from 1 hour to 48 hours.

In a particular embodiment the method comprises mixing polyvinylchloride (PVC) with an aqueous solvent, a catalyst selected from 5 wt % Pd on carbon, 5 wt % Pt on carbon, or dichloro(1,2-bis(diphenylphosphino)ethane)nickel, and an amine base, to form a first mixture, the first mixture having a PVC:catalyst ratio of from 10:1 to 3:1. The first mixture is then heated in the presence of hydrogen gas at a pressure of from 50 PSI to 150 PSI and at a temperature of from 75° C. to 350° C., such as from 100° C. to 350° C., to form a second mixture comprising polyethylene.

The foregoing and other objects, features, and advantages of the invention will become more apparent from the following detailed description, which proceeds with reference to the accompanying figures.

BRIEF DESCRIPTION OF THE DRAWINGS

FIG. 6 is a table of experimental conditions and yields providing exemplary reaction conditions using an amine base.

DETAILED DESCRIPTION

I. Definitions

Figure 1:
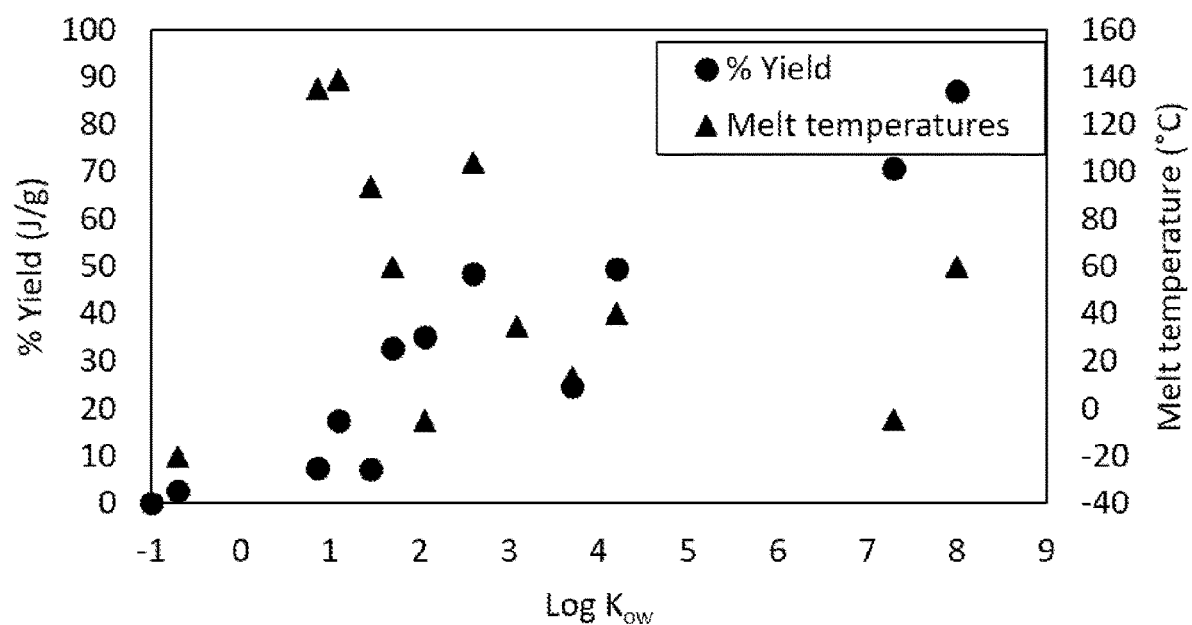
FIG. 1 is a graph of percentage yield and melt temperature versus Log $K_{ow}$, illustrating the melt temperatures determined by DSC and yields of the reaction products of the disclosed process.

The following explanations of terms and methods are provided to better describe the present disclosure and to guide those of ordinary skill in the art in the practice of the present disclosure. The singular forms "a," "an," and "the" refer to one or more than one, unless the context clearly dictates otherwise. The term "or" refers to a single element of stated alternative elements or a combination of two or more elements, unless the context clearly indicates otherwise. As used herein, "comprises" means "includes." Thus, "comprising A or B," means "including A, B, or A and B," without excluding additional elements. All references, including patents and patent applications cited herein, are incorporated by reference in their entirety, unless otherwise specified.

Unless otherwise indicated, all numbers expressing quantities of components, molecular weights, percentages, temperatures, times, and so forth, as used in the specification or claims, are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is expressly recited.

Unless explained otherwise, all technical and scientific terms used herein have the same meaning as commonly understood by one of ordinary skill in the art to which this disclosure pertains. Although methods and materials similar or equivalent to those described herein can be used in the practice or testing of the present disclosure, suitable methods and materials are described below. The materials, methods, and examples are illustrative only and not intended to be limiting.

II. Overview

This technology addresses the issue of recycling polyvinyl chloride (PVC) waste. Waste materials that contain PVC are incredibly difficult to recycle mechanically. Meanwhile, thermochemical methods such as pyrolysis are undesirable chemical pathways because of the HCl and chlorinated organic compounds that may be produced by the thermal decomposition of PVC.

Disclosed herein is a chemical method of converting PVC to a chlorine free polymer that is recyclable, such as high density polyethylene (HDPE). This technology can be used by PVC manufacturers for recycling their waste PVC product. This could enable production of an economically valuable polymer in the hot melt adhesives market and enable chlorine recovery for efficient material recycle streams in production plants. In some embodiments, the scale-up of this process may use high hydrogen pressures and facile product separation and recovery.

III. Process

The technology produces a re-useable, chlorine-free polymer, which is derived from polyvinyl chloride (PVC). In some embodiments, high density polyethylene (HDPE) powder is produced. The product polymer may be made by mixing PVC powder of any molecular weight in a suitable solvent, such as an aqueous solvent, (for example, water, or a water/organic solvent mixture) or an organic solvent, to form a slurry, suspension, or solution of PVC. The mixture may further comprise a base, such as an aqueous base. Organic solvents suitable for use in the process, and optionally as part of an water/organic solvent mixture, include, but are not limited to, an alcohol, such as methanol, ethanol, 1-propanol, isopropanol, 1-butanol, iso-butanol, sec-butanol, and/or tert-butanol; tetrahydrofuran (THF); pyridine (which also may be used as a base); trialkylamine (which also may be used as a base), such as trimethylamine, triethylamine, or diisopropylamine; dimethylformamide (DMF); or a combination thereof.

Suitable bases include, but are not limited to, inorganic bases, organic bases, or a combination thereof. Suitable inorganic bases include, but are not limited to, hydroxide bases, such as NaOH, KOH, LiOH, CsOH, $Ca(OH)_2$, $Ba(OH)_2$, $Sr(OH)_2$, ammonium hydroxide, etc., or combinations thereof, carbonate bases, such as sodium carbonate, potassium carbonate, calcium carbonate, lithium carbonate, ammonium carbonate, or a combination thereof, and/or corresponding hydrogen carbonate base(s), or a combination thereof. Suitable organic bases include, but are not limited to, amine bases, such as alkylamines, dialkylamines or trialkylamines (for example, triethylamine, butylamine, benzylamine, N,N-diisopropylethylamine, diethylamine, N,N-dimethylhexylamine, trihexylamine, hexylamine, N-methyl-N-octylamine, N,N-dimethyloctylamine, octylamine, trioctylamine, N,N-dimethylbutylamine, or mixtures thereof), pyridine, or a combination thereof. Suitable combinations of bases include, but are not limited to, a combination of two or more alkylamines, dialkylamines and/or trialkylamines, for example, N,N-dimethylhexylamine and trihexylamine, or a combination of a trialkylamine and a hydroxide base, such as trihexylamine and a hydroxide base, for example NaOH or KOH.

Typically, the base has a concentration in the reaction mixture suitable to facilitate the reaction proceeding. In some embodiments, the base concentration is from zero to 10 M or more, such as from greater than zero to 10 M, from zero to 5 M, from greater than zero to 5 M, from 0.0001 M to 5 M, from 0.01 M to 5 M, or from 1 M to 3 M.

In certain embodiments, the base is or comprises an organic base including combinations of organic bases, and may comprise a primary, secondary and/or tertiary alkylamine.

In other embodiments, a base is not used. In some such embodiments, the solvent is water.

The PVC mixture typically is heated in the presence of one or more catalysts. The catalyst(s) may be any catalyst(s) suitable for hydrogenation reactions, and may be an inorganic catalyst(s). In some embodiments, the catalyst(s) is a heterogenous transition metal catalyst, such as a heterogenous transition metal catalyst that is typically used for hydrogenation reactions. In other embodiments, the catalyst(s) may be a homogeneous and/or organic catalyst. Suitable catalysts include, but are not limited to, Ni, Ru, Pd, Pt, and/or Rh catalysts, such as Ni, Ru, Pd, Pt, and/or Rh metal optionally on a support disclosed herein, such as carbon, $Pd(OH)_2$, $PtO_2$, wilkinson's catalyst (chloridotris(triphenylphosphine)rhodium(I)), $RhCl(TPPMS)_3$ (TPPMS=monosulfonated triphenylphosphane), $RhCl(TPPTS)_3$ (TPPTS=trisulfonated triphenylphosphane), dichloro(1,2-bis(diphenylphosphino)ethane)nickel, or a combination thereof. The catalyst may be supported on a suitable catalyst support, such as carbon, barium carbonate, barium sulfate, calcium carbonate, silica, alumina ($Al_2O_3$), silica-alumina (SiAl), hydrotalcite, or a combination thereof. In some embodiments, a catalyst with a carbon support is used. The loading of a catalyst onto a support may be from greater than zero to less than 100 wt %, such as from 0.001 wt % to less than 100 wt %, from 0.001 wt % to 65%, from 0.1 weight % to 65 weight %, from 0.1 wt % to 50 wt %, from 0.1 wt % to 25 wt % or from 0.1 wt % to 10 wt %, with the balance being the support. In certain embodiments, the catalyst loading is 5 wt % on a support. In other embodiments, the catalyst is not on a support. In some embodiments, the catalyst is Pd supported on carbon (for example, 5 weight % palladium with the balance carbon, 5% Pd/C). In other embodiments, Pt supported on carbon (for example, 5 weight % platinum with the balance carbon, 5% Pt/C) is used.

The amount of catalyst (including the support, if present) used in the reaction may be any amount suitable to facilitate the reaction proceeding. In some embodiments, a ratio of PVC to catalyst (PVC:catalyst) in the reaction is from 1000:1 to 1:5, such as from 100:1 to 1:1, from 20:1 to 2.5:1, from 10:1 to 3:1, or from 7:1 to 4:1 PVC:catalyst, for example, from 7:1 to 4:1 PVC to 5% Pt/C or from 7:1 to 4:1 PVC to 5% Pd/C. In some embodiments, a ratio of PVC to catalyst is 5:1. But in other embodiments, a catalyst is not used. In some embodiments where a catalyst is not used, the base is a trialkylamine, and may be a trialkylamine where at least one alkyl group, and optionally 2 or 3 alkyl groups independently, comprises from 6 to 10 carbon atoms, such as hexyl, heptyl, octyl, nonyl, or decyl.

The reaction maybe performed in the presence of a gas that is or comprises hydrogen gas. But in other embodiments, the reaction is performed without hydrogen gas. In some embodiments, the gas is substantially pure hydrogen, but in other embodiments the gas is a mixture of gases that includes hydrogen gas. In some embodiments, hydrogen gas is added to the reaction without first removing the ambient air from the reaction vessel. Accordingly, the gas is a mixture of air and hydrogen gas. In other embodiments, the reaction vessel may be flushed with an inert gas, such as helium, nitrogen and/or argon, prior to the addition of hydrogen gas. In embodiments where the reaction is performed without hydrogen, the reaction vessel may be flushed with an inert gas, such as nitrogen, but hydrogen is not subsequently added. In some embodiments, the gas comprising hydrogen gas also comprises the inert gas and/or air. In particular embodiments, oxygen gas is substantially removed from the reaction vessel head space before the hydrogen gas for the reaction is added, for example, by flushing with an inert gas and/or hydrogen gas, and/or by vacuum. In some embodiments, the reaction vessel is flushed with hydrogen before the final pressurization, such that the gas that is exposed to the reaction mixture is substantially pure hydrogen.

After any gas flushing is performed, hydrogen gas may be added to the reaction to provide a gas pressure suitable to facilitate the hydrogenation reaction. In some embodiments, the gas pressure may be from 1 bar or less to 50 bar or more, such as from greater than 1 bar to 50 bar, or from 3 bar to 30 bar. If present, the additional gas (for example, an inert gas and/or air) may be present at a pressure of from greater than zero to 1 bar or more. In some embodiments, the pressure of the additional gas before the hydrogen is added is 1 bar or less.

In some embodiments, the hydrogen pressure in the reaction vessel is from 0 PSI to 350 PSI or more. A person of ordinary skill in the art understands that a hydrogen pressure of 0 PSI means that no hydrogen is added, for example, after flushing with an inert gas. When hydrogen is present, the hydrogen gas pressure may be from greater than zero PSI to 350 PSI, such as from greater than zero to 200 PSI, from 30 PSI to 150 PSI, from 50 PSI to 150 PSI, or from 50 PSI to 100 PSI. In some embodiments, a pressure of 80 PSI is used. A person of ordinary skill in the art understands that the hydrogen pressure is given as pressure above atmospheric pressure. That is, a reaction vessel starts at atmospheric pressure, such as after flushing with an inert gas, and hydrogen is added to the vessel to achieve a pressure of 200 PSI above atmospheric pressure (also referred to as above gauge) in the vessel. In reactions performed at 0 PSI hydrogen pressure, the reaction typically is performed at an inert gas pressure of 15 PSI (i.e., 15 PSI above gauge), for example, at a nitrogen pressure of 15 PSI.

The hydrothermal treatment is performed at a suitable temperature, such as a temperature below a pyrolysis temperature of the PVC and/or a product polymer. Suitable temperatures include, but are not limited to, from 30° C. to 350° C. or more, such as from greater than 50° C. to 350° C., such as from 55° C. to 350° C., from 60° C. to 350° C., from 65° C. to 350° C., from 70° C. to 350° C., from 75° C. to 350° C., from 100° C. to 350° C., from 125° C. to 300° C., from 150° C. to 250° C., from 75° C. to 250° C., or from 75° C. to 200° C. The reaction mixture may be heated for a time period suitable to facilitate the reaction progressing, such as substantially to completion. In some embodiments, the reaction is heated for from 1 hour or less to 48 hours or more, such as from 6 hours to 36 hours, or about 24 hours.

After the reaction is finished, the reaction product is separated and may be analyzed by a suitable technique, such as DSC, TGA, and/or FTIR, to confirm the presence of the chlorine-free polymer, such as HDPE. In some embodiments, the chlorine-free polymer product may be separated by allowing it to rise to the top of the reaction mixture, from where it can be removed, while any unreacted PVC and/or heterogeneous catalyst sink to the bottom of the reaction mixture. Such separation may be performed, for example, in a three-phase separator.

Figure 2:
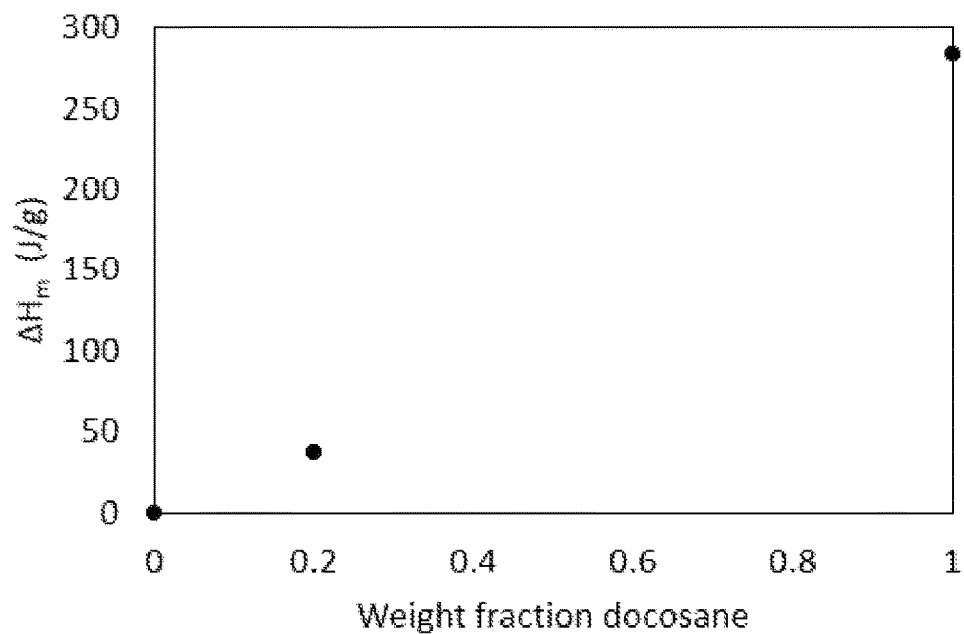
FIG. 2 is a graph of heat of melting ($\Delta H_m$) versus weight fraction docosane, illustrating the DSC calibration of weight fraction n-docosane vs $\Delta H_m$.

In some embodiments, the percentage yield is calculated based on the heat of melting of the analyzed product compared to the heat of melting of pure docosane wax. The heat of melting is quantified in Joules/gram and accordingly the percentage yield is reported in Joule/gram. FIG. 2 provides a calibration curve for the heat of melting versus weight fraction of docosane wax.

In some embodiments, the yield is at least 10% (J/g), such as at least 20% (J/g), at least 25% (J/g), at least 30% (J/g), at least 40% (J/g), at least 50% (J/g), at least 60% (J/g), at least 70% (J/g), at least 75% (J/g), at least 80% (J/g), at least 85% (J/g), at least 90% (J/g), at least 95% (J/g), at least 97% (J/g), at least 98% (J/g), or at least 99% (J/g).

Additionally, chlorine may be recovered from the reaction mixture, such as by recovering a chloride salt (for example sodium chloride or potassium chloride) or an HCl salt (for example, triethylamine hydrochloride) formed by a reaction between the base, if present, and the chlorine that was removed from the PVC. In embodiments where a base is not added, chlorine may be recovered in the form of HCl gas and/or HCl in the solvent. Additionally, or alternatively, a base could be added to the reaction mixture after the hydrogenation reaction, to neutralize any HCl present and facilitate chlorine recovery.

In some embodiments, the reaction comprises heating a mixture comprising PVC, a solvent, a catalyst, and a base in the presence of hydrogen gas.

In some embodiments, the reaction comprises heating a mixture comprising PVC, a solvent, a catalyst, and a base in the absence of hydrogen gas.

In some embodiments, the reaction comprises heating a mixture comprising PVC, a solvent, and a catalyst in the presence of hydrogen gas without a base.

In some embodiments, the reaction comprises heating a mixture comprising PVC, a solvent and a base in the presence of hydrogen gas without a catalyst.

IV. Application for the Disclosed Process

The disclosed process converts PVC into polyethylene products that are suitable for other uses. Most commercial grades of PVC have molecular weights below 60000 and are linear. As such, de-chlorination produces a linear polyethylene molecule that is suitable for use in hot melt adhesives (HMA), partially replacing Fischer-Tropsch waxes currently in use in the $8 Billion HMA market in the USA. HMAs are considered an attractive commodity due to their long shelf life and the fact that they pose a low environmental hazard compared to solvent based adhesives. The market for HMAs is expected to expand in the U.S at an annual growth rate of 4.8% through 2028. HMAs used industrially typically have melt ranges of 80-130° C. Several of the melting temperatures (FIG. 1) of the reaction products produced by the disclosed process fall within this range, based on DSC analysis. FIG. 1 demonstrates that, in some embodiments, reaction products from the disclosed process have a melting point range of from dodecane melt range hydrocarbons to polyethylene polymer melts at 130° C. Most reaction products have a melt range of from 20° C. to 100° C., which is consistent with hydrocarbon wax range melt temperatures.

V. Examples

Example 1

Experimental Details:

In one typical experiment, 30 mg of PVC powder is mixed physically with 5 mg of Pd/C catalyst powder. This powder mix is added to a 12 mL pressure tube batch reactor ("Q-tube") and suspended in 3 mL of water with a stir bar mixing. The system is pressurized with hydrogen to 60 PSI. Then the pressurized Q tube is heated at 200° C. for 24 hours. The reactor is cooled to room temperature and the water evaporated. The solids are collected and analyzed via DSC. Integration of the polyethylene melt curve gives a yield of HDPE equal to 1% of the initial weight of PVC.

Example 2

Experiment Methods:

Experiments were performed in glass batch systems with 2 mL liquid volume, connected to a pressure manifold of approximately 20 mL total volume. 100 mg of PVC powder was contacted with catalyst powder and 2 mL of an organic or inorganic base solution. In the case of an organic (amine) base, the amount of base was determined by the desired atomic ratio of N:Cl. The manifold was pressurized with hydrogen gas to the desired pressure and heated to the reaction temperature.

In other embodiments, 75 mL stainless steel or Inconel reactors were used. These were charged with PVC, catalyst, and a liquid base to a volume of 37 mL. They were then charged with hydrogen to the desired pressure and heated to the appropriate temperature.

Reaction Work Up:

Reaction work up was performed by cooling down the Q tubes or hydrothermal vessels in room temperature water. The reaction product mixture comprising salt, catalyst, and polymer was then poured/scraped onto a crystallization dish and dried in a vacuum oven at 40° C. for 48 hours. This dried product mixture was then used for analysis.

Exemplary Experiment with Amine Base:

1.10 mL of Trihexylamine, 0.9 mL water, 20 mg of a 5 wt % Pt loading Pt/C catalyst, 100 mg PVC, and a stir bar were added to a Q tube reactor manifold. The pressure manifold was then purged 3 times with $H_2$ gas and then loaded to final pressure of 80 PSI $H_2$ above gauge. The loaded Q tube reactor manifold was then placed on the Q lab tech heating block preheated to 200° C. and allowed to react for 24 hours. The product at the end of the reaction was scraped/poured into a crystallization dish and dried for 48 hours in a vacuum oven at 40° C.

Exemplary Experiment with Aqueous Base:

100 mg of PVC and 20 mg of 5 wt % Pt/C were added to a Q tube vessel. Then 2 mL of 2.5 M KOH solution was added to the Q tube reactor. The pressure manifold was purged 3 times with $H_2$ gas and loaded to final pressure of 60 PSI $H_2$ above gauge. The loaded Q tube reactor manifold was then placed on the Q lab tech heating block preheated to 200° C. and allowed to react for 24 hours. The reaction product then was scraped/poured into a crystallization dish and dried for 48 hours in a vacuum oven at 40° C.

Figure 3:
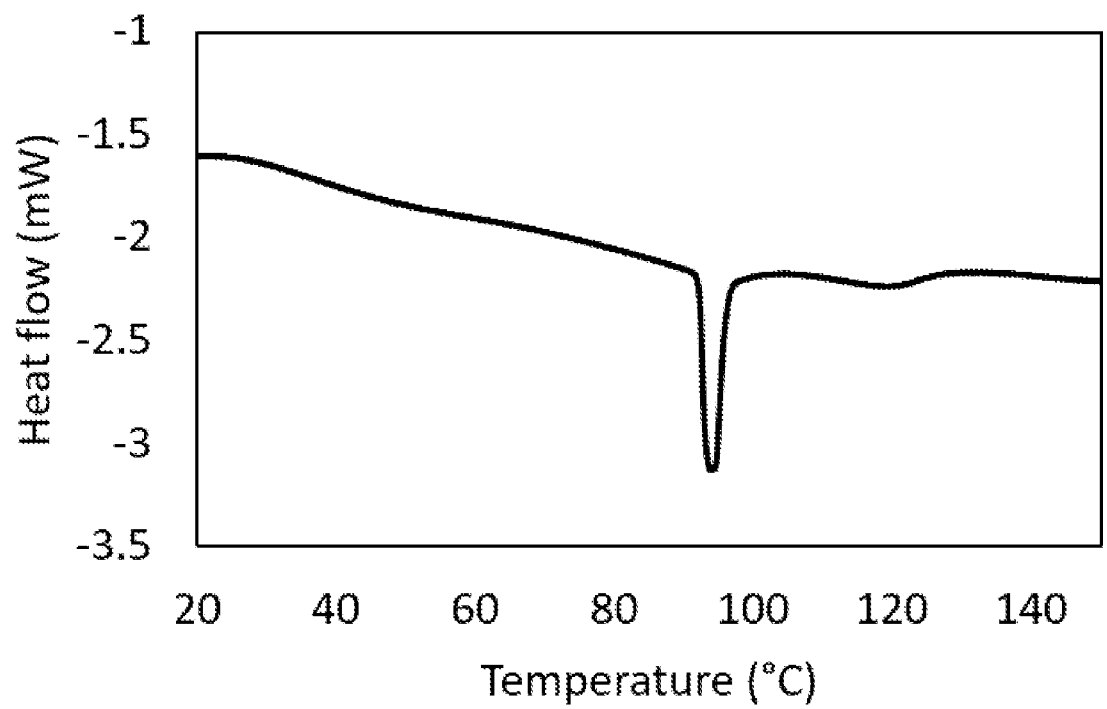
FIG. 3 is a graph of heat flow versus temperature, illustrating a DSC curve of an exemplary reaction product mixture and showing a melt curve at 95° C.

Product Analysis Methods:

DSC analysis: The heat of melting ($\Delta H_m$) from DSC analysis was measured as a function of the weight fraction of n-docosane wax in a matrix of ammonium salt, Pt supported on carbon, and wax. A calibration curve generated from the plot of $\Delta H_m$ vs weight fraction wax (FIG. 2) was used to calculate the yield in J/g for each product mixture. The $\Delta H_m$ for each product mixture was measured by integrating the melt curve on the resultant heating curve from DSC analysis. An example of the heating curve for a reaction product mixture is shown in FIG. 3. The conditions for the example shown in FIG. 3 were triethylamine base 2:1 N:Cl ratio, 1:5 Pt/C:PVC mass ratio, 80 PSI $H_2$, 200° C., and 24 hours reaction time.

Figure 4:
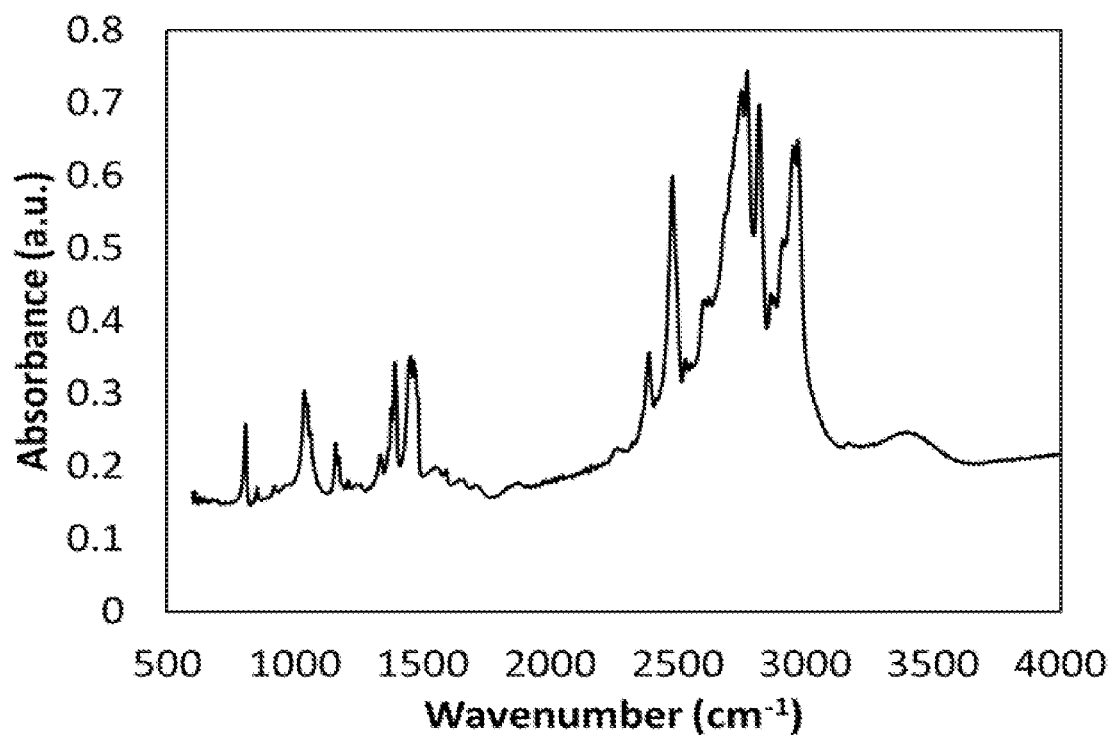
FIG. 4 is an FTIR spectrum of an exemplary product mixture, illustrating the PVC de-chlorination and polyene (double bond) character of the reaction product.
Figure 5:
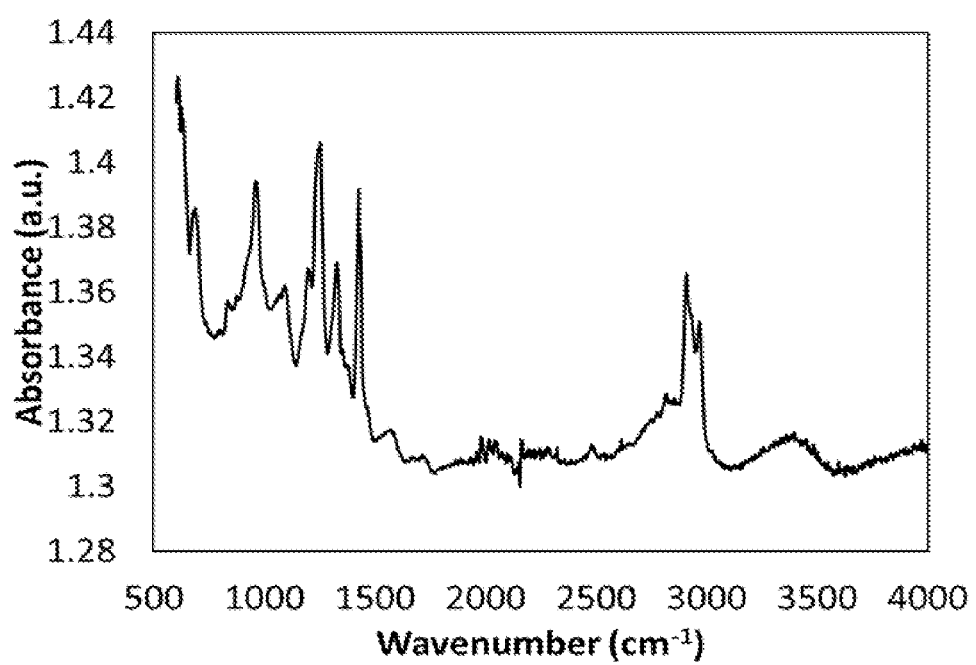
FIG. 5 is an FTIR spectrum of a mixture of Pt/C and PVC that was mixed with triethylamine base but not reacted, that is no pressure or no heat applied.

FTIR analysis: PVC de-chlorination and polyene (double bond) character was estimated with FTIR. The analysis was performed with an Attenuated Total Reflectance (ATR) system in % transmittance mode. The FTIR spectra was collected from 600-3500 $cm^{-1}$. C—Cl reduction was measured using peak height reduction at about 695 $cm^{-1}$. Double bond character was measured by the increase/decrease of the C=C—H stretch peak at about 3000-3100 $cm^{-1}$. The peak heights were normalized to the peak height of the C—H stretch at about 2900 $cm^{-1}$. An example spectra of a product matrix is shown in FIG. 4. The conditions for the example shown in FIG. 4 were 200° C., 1:5 Pt/C:PVC ratio, 80 PSI $H_2$, 2:1 N:Cl ratio triethylamine base, and 24 hours reaction time. And FIG. 5 provides a comparison FTIR spectrum of the starting materials without pressure or heat applied.

Figures 7, 8:
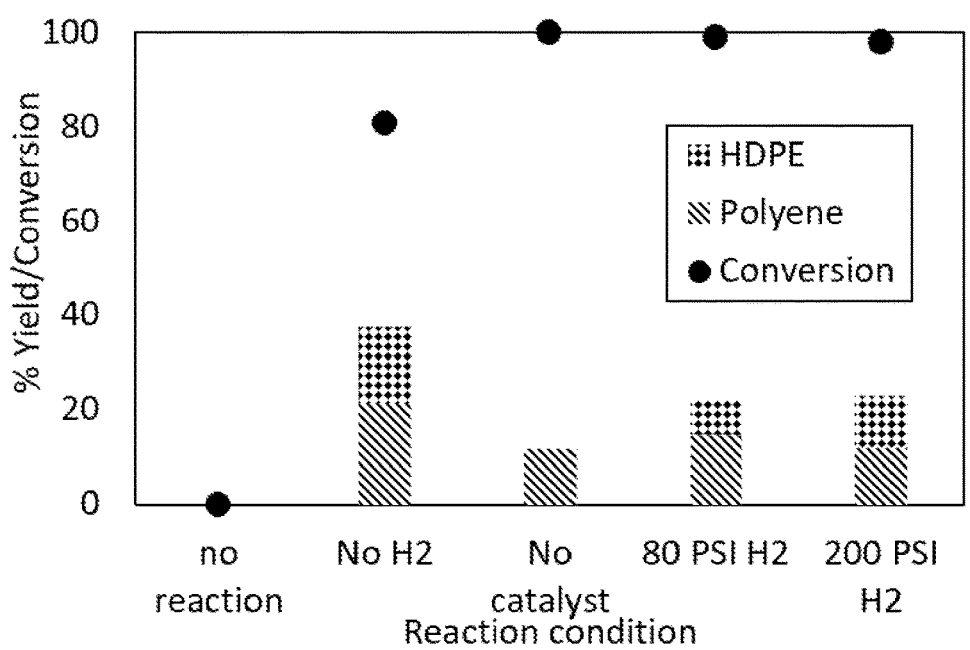
FIG. 7 is a table of experimental conditions and yields providing exemplary reaction conditions using an aqueous base.
FIG. 8 is a graph of percentage yield/conversion versus reaction conditions, illustrating how yield or conversion amount varies with different reaction conditions.

Data and Results:

Reaction parameters and yield data are provided in FIGS. 6 and 7. Reaction outcomes were measured by analyzing the melt yield on the DSC, and the highest PVC dechlorination % possible.

FIG. 8 is a graph of percentage yield or conversion versus reaction conditions and demonstrates that hydrogen and a catalyst in combination with a base, such as an amine base, produce a good yield. The size of the amine base can be compared numerically based on the octanol-water coefficient ($K_{ow}$). The data provided in FIG. 6 suggests that using a larger amine base (such as trihexylamine) but no catalyst still provided a melt yield. However, using a smaller amine base (such as triethylamine) without using a catalyst produced no measurable melt yield on the DSC.

The range of conditions and the percent yield from DSC analysis is shown for experiments using amine base and aqueous base in FIGS. 6 and 7. The data provided in in FIG. 7 demonstrates that yields from DSC were lower when using an aqueous base than the yields obtained using amine bases, when different common hydrogenation catalysts were screened. Lower yields were also observed in experiments that did not include a base (that is, only DI water). Additionally, the melt yield was reduced when the reaction was run without hydrogen and also when it was run without base, when all other parameters were kept constant. For example, see the results in FIG. 7 from experiments with $H_2$ and without $H_2$ using Pd/C catalyst.

Figure 9:
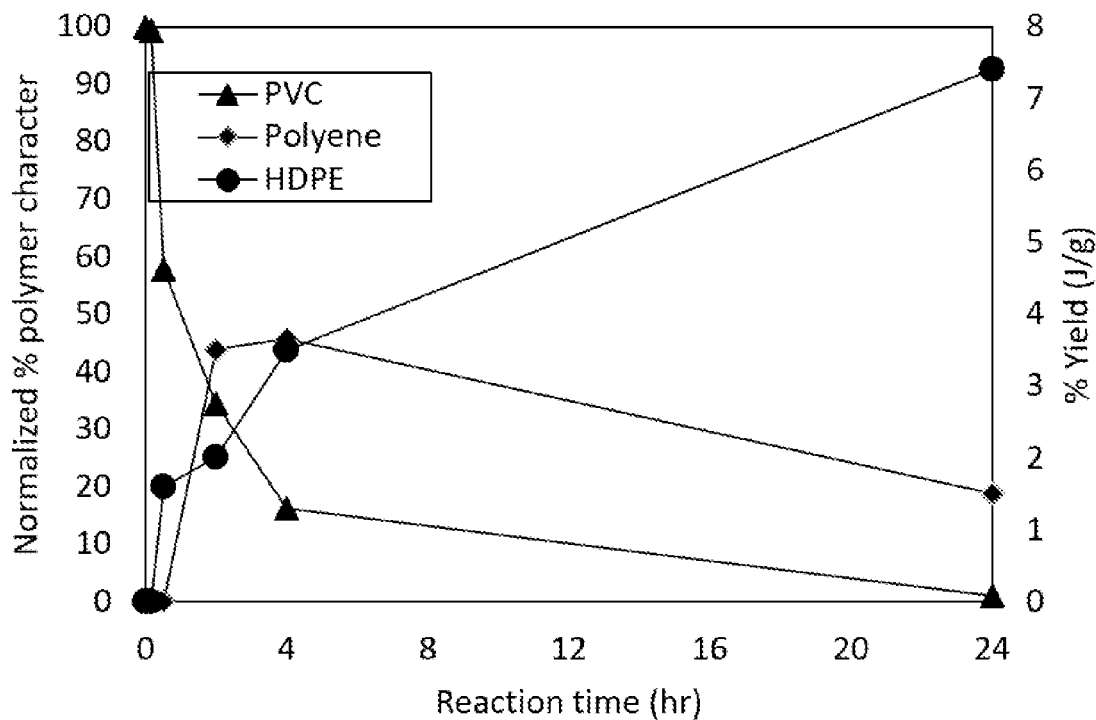
FIG. 9 is a graph of normalized percentage polymer character versus reaction time, illustrated the progress of an exemplary reaction over time.

The PVC conversion kinetics and double bond character (polyene character) were estimated with FTIR (FIG. 9). FIG. 9 demonstrates that after 24 hours, an experiment using a triethylamine base, 80 PSI $H_2$ and a catalyst:PVC ratio of 1:5. Had achieved 99% de-chlorination of the PVC. The formation of double bond character can be associated with the formation of polyene that can be hydrogenated to a linear polyethylene type molecule.

Figure 10:
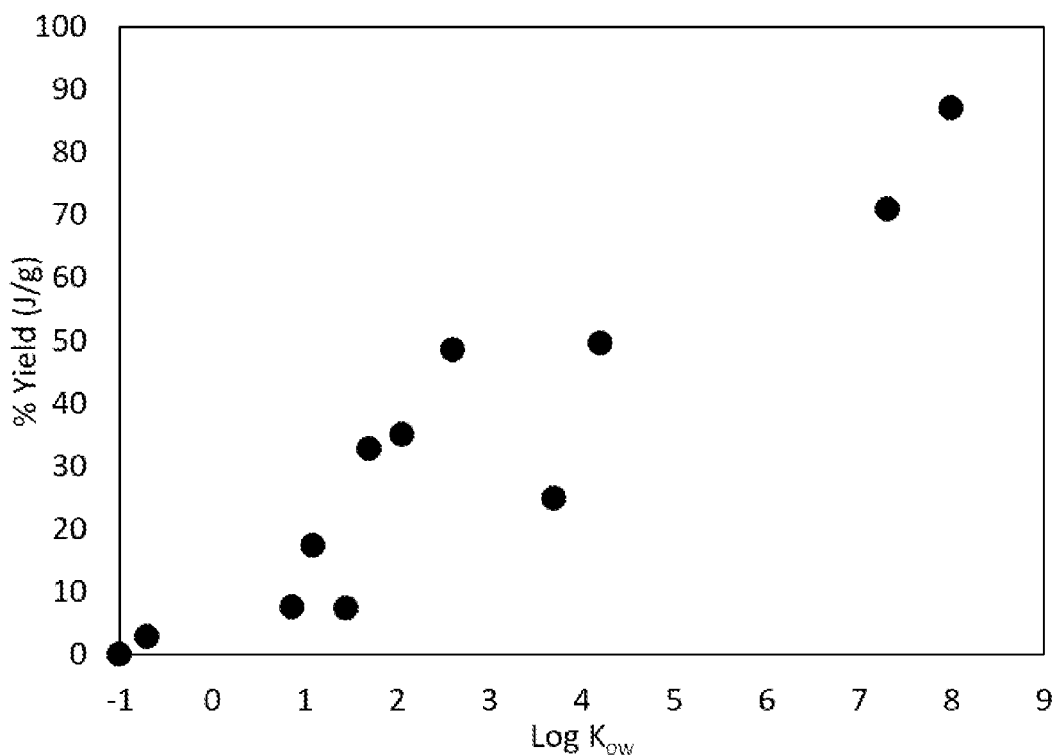
FIG. 10 is a graph of yield versus Log $K_{ow}$, illustrating the different yields as measured by melt yield obtained using amine bases having different $K_{ow}$ values.

To explore the hypothesis that the larger the $K_{ow}$ of the amine base, the more efficient the process for dechlorination and hydrogenation would be, the $K_{ow}$ for amine bases were plotted against the yield (FIG. 10). The reaction conditions and information for each amine base is provided in FIG. 6. The results in FIG. 6 suggest that as the size of the alkylamine base increased (as indicated by an increasing affinity to octanol in an octanol water system) the observed melt yield also increased.

Discussion:

Without being bound to a particular theory, while use of an aqueous base in the hydrothermal treatment of PVC provided evidence of both de-chlorination and semi-crystalline polymeric product, charging the PVC slurry with amine bases (for example, $R_3N$) may be advantageous. At equilibrium the base penetration into PVC particles may be described by the equilibrium between the chemical potential of the base in the aqueous phase and the chemical potential of the base in the polymer phase of the mixture. This relationship is described by equation 1.

$$\gamma_{R_3N}^{aq} x_{R_3N}^{aq} P_{R_3N}^{sat} = \gamma_{R_3N}^{pol} x_{R_3N}^{pol} P_{R_3N}^{sat} \qquad (1)$$

The fraction of amine base present in the polymer phase likely will be higher than the fraction of aqueous base in the polymer phase because the activity coefficient of aqueous base likely will be higher in an organic phase than the activity coefficient of an amine base in the polymer phase ($\gamma_{R_3N}^{aq} > \gamma_{R_3N}^{pol}$). The significantly higher relative concentration of $R_3N$ molecules compared to their aqueous counterparts can be approximated by the octanol water coefficient (equation 2).

$$x_{R_3N}^{pol} \approx k_{ow} = \frac{x_{octanol}}{x_{water}} \qquad (2)$$

This hypothesis can be tested by quantifying the melt area from DSC analysis of the product matrix; which is a direct indicator of the amount of semi-crystalline polymer obtained from reacting the PVC charge. Further, inverse x-ray tomography provides 3-dimensional images of the polymer/base/catalyst matrix which demonstrate the lack of success by the aqueous base in penetrating the PVC particle phase.

Figure 11:
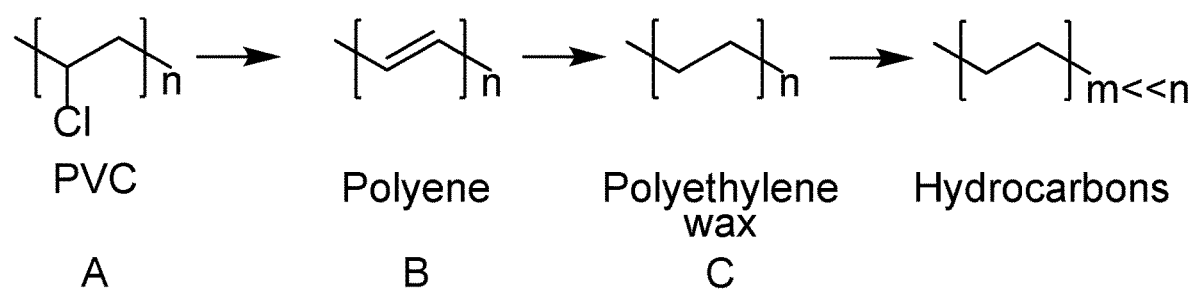
FIG. 11 is a schematic diagram illustrating a possible reaction path for the process.

A higher concentration of base in the polymer phase may drive de-chlorination of the PVC to a poly(ene) type low molecular weight macromolecule. The organic base may facilitate an E1cb reaction where the neighboring hydrogen on the PVC backbone is abstracted by the base, thereby facilitating de-chlorination. This would suggest that the strength of the base, as well as its concentration in the polymer phase, may be driving the rate of de-chlorination. The reaction may be considered as a series of irreversible reactions taking place in the PVC particles in which A→B→C where "A" is PVC, "B" is a de-chlorinated polyene and product "C" is a hydrogenated wax like molecule, and the reaction may further process to produce smaller hydrocarbon chains, as illustrated in FIG. 11. The rate of de-chlorination is described in equation 3.

$$-R_A = k(pka)(x_{R_3N}^{pol}) \qquad (3)$$

The proposed reaction was investigated by treating the amine base as a variable and maintaining the same reaction temperature, pressure, and catalyst loading. The product matrix of polymer, catalyst, and base was then analyzed with TGA, DSC, and/or FTIR to quantify changes in the thermal stability, melting/recrystallization behavior, and bonding of the resultant polymer. The results demonstrated that, in general, the larger the $K_{ow}$ of the base, the larger the melt area was from DSC analysis, indicating a higher yield of product.

The relative amount of still chlorinated polymer and relative amount of polyene was measured with FTIR. In a series of experiments, the amount of chlorinated polymer, polyene polymer, and melt area in the DSC was quantified versus reaction time. The results demonstrated an accumulation of the intermediate polyene in reacting system which peaks in concentration after the maximum rate of de-chlorination, indicating an accumulation of the polyene in the system.

VI. Exemplary Embodiments

The following numbered paragraphs illustrate exemplary embodiments of the disclosed technology.

Paragraph 1. A method, comprising:
  mixing polyvinylchloride (PVC) with a solvent and a catalyst to form a first mixture; and
  heating the first mixture in the presence of a gas comprising hydrogen gas to form a second mixture comprising polyethylene.

Paragraph 2. The method of paragraph 1, wherein the solvent is water.

Paragraph 3. The method of paragraph 1, wherein the solvent comprises water and one or more organic solvents.

Paragraph 4. The method of paragraph 3, wherein the one or more organic solvents are selected from an alcohol, THF, pyridine, dimethylformamide, or triethylamine.

Paragraph 5. The method of any one of paragraphs 1-3, wherein the first mixture further comprises a base.

Paragraph 6. The method of paragraph 5, wherein the base is a hydroxide base.

Paragraph 7. The method of paragraph 6, wherein the base is KOH, NaOH, LiOH, $Ca(OH)_2$, $Ba(OH)_2$, $Sr(OH)_2$, or a combination thereof.

Paragraph 8. The method of any one of paragraphs 5-7, wherein the base has a base concentration in the solvent of from greater than zero to 10 M.

Paragraph 9. The method of paragraph 8, wherein the base concentration is from 1M to 3M.

Paragraph 10. The method of any one of paragraphs 1-9, wherein the catalyst is an inorganic catalyst.

Paragraph 11. The method of any one of paragraphs 1-10, wherein the catalyst is a heterogeneous transition metal catalyst.

Paragraph 12. The method of paragraph 11, wherein the catalyst comprises Ni, Ru, Pd, Pt, Rh or a combination thereof.

Paragraph 13. The method of any one of paragraphs 10-12, wherein the catalyst comprises a catalyst support selected from carbon, barium carbonate, barium sulfate, calcium carbonate, silica, $Al_2O_3$, SiAl, Hydrotalcite, or a combination thereof.

Paragraph 14. The method of paragraph 13, wherein the catalyst support is carbon.

Paragraph 15. The method of paragraph 13 or paragraph 14, wherein the catalyst has a catalyst loading on the carbon support of from 0.1 wt % to 65 wt %.

Paragraph 16. The method of paragraph 15, wherein the catalyst loading is from 1 wt % to 10 wt %.

Paragraph 17. The method of paragraphs 15, wherein the catalyst loading is 5 wt %.

Paragraph 18. The method of paragraph 10, wherein the catalyst is 5 wt % Pd on carbon.

Paragraph 19. The method of any one of paragraphs 1-18, wherein a ratio of PVC to catalyst in the mixture is from 1:1 to 20:1.

Paragraph 20. The method of paragraph 19, wherein the ratio of PVC to catalyst is from 2.5:1 to 10:1.

Paragraph 21. The method of paragraph 19, wherein the ratio of PVC to catalyst is from 4:1 to 7:1.

Paragraph 22. The method of paragraph 19, wherein the ratio of PVC to catalyst is about 5:1.

Paragraph 23. The method of any one of paragraphs 1-22, wherein the gas is substantially pure hydrogen gas.

Paragraph 24. The method of any one of paragraphs 1-23, wherein the gas is a gas mixture comprising hydrogen gas and at least one additional gas.

Paragraph 25. The method of paragraph 24, wherein the at least one additional gas is air.

Paragraph 26. The method of paragraph 24, wherein the at least one additional gas is or comprises an inert gas.

Paragraph 27. The method of paragraph 26, wherein the inert gas is nitrogen, helium, argon, or a combination thereof.

Paragraph 28. The method of any one of paragraphs 1-27, wherein the gas has a gas pressure of from 1 bar to 50 bar.

Paragraph 29. The method of paragraph 28, wherein the gas pressure is from 3 bar to 30 bar.

Paragraph 30. The method of any one of paragraphs 1-29, where heating the first mixture comprises heating the first mixture to a temperature of from 100° C. to 350° C.

Paragraph 31. The method of paragraph 30, wherein the temperature is from 150° C. to 250° C.

Paragraph 32. The method of any one of paragraphs 1-31, wherein heating the first mixture comprises heating the first mixture for a time period of from 1 hour to 48 hours.

Paragraph 33. The method of any one of paragraphs 1-32, wherein the polyethylene is high density polyethylene powder.

Paragraph 34. The method of any one of paragraphs 1-33, wherein the method further comprises agitating the first mixture during heating.

Paragraph 35. The method of paragraph 34, wherein agitating comprises stirring or shaking.

Paragraph 36. The method of any one of paragraphs 1-35, further comprising cooling the second mixture and isolating the polyethylene.

Paragraph 37. The method of any one of paragraphs 1-36, further comprising recovering at least a portion of the chlorine that is removed from the PVC.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method, comprising:
   mixing polyvinylchloride (PVC) with
      a solvent and
      a catalyst and a base,
      to form a first mixture; and
   heating the first mixture in the presence of hydrogen gas, to form a second mixture comprising polyethylene;
   wherein the base is a hydroxide base, an alkylamine, a dialkylamine, a trialkylamine, or a combination thereof.

2. The method of claim 1, wherein the solvent comprises water.

3. The method of claim 1, wherein the solvent comprises one or more organic solvents selected from an alcohol, THF, pyridine, dimethylformamide, or triethylamine.

4. The method of claim 1, wherein the base is triethylamine, N,N-diisopropylethylamine, diethylamine, N,N-dimethylhexylamine, trihexylamine, octylamine, trioctylamine, or a combination thereof.

5. The method of claim 1, wherein the base has a base concentration in the solvent of from greater than zero to 10 M.

6. The method of claim 1, wherein the catalyst is an inorganic catalyst.

7. The method of claim 1, wherein the catalyst comprises Ni, Ru, Pd, Pt, Rh or a combination thereof.

8. The method of claim 7, wherein the catalyst has a catalyst loading on a catalyst support of from 0.1 wt % to 65 wt %.

9. The method of claim 1, wherein the catalyst is Ni, Ru, Pd/C, Pt/C, Rh, $Pd(OH)_2$, $PtO_2$, wilkinson's catalyst (chloridotris(triphenylphosphine)rhodium(I)), $RhCl(TPPMS)_3$ (where TPPMS=monosulfonated triphenylphosphane), $RhCl(TPPTS)_3$ (where TPPTS=trisulfonated triphenylphosphane), dichloro(1,2-bis(diphenylphosphino)ethane)nickel ($Ni(dppe)Cl_2$), or a combination thereof.

10. The method of claim 1, wherein the catalyst is 5 wt % Pd on carbon or 5 wt % Pt on carbon.

11. The method of claim 10, wherein the base comprises an alkylamine, dialkylamine, trialkylamine, or a combination thereof.

12. The method of claim 1, wherein:
   a ratio of PVC to catalyst in the first mixture is from 1000:1 to 1:5 wt: wt (PVC: catalyst);
   the hydrogen gas has a hydrogen gas pressure of from greater than zero to 350 PSI;

heating the first mixture comprises heating the first mixture to a temperature of from 50° C. to 350° C.;
or a combination thereof.

13. The method of claim 12, wherein the ratio of PVC to catalyst is from 20:1 to 2.5:1 wt: wt.

14. The method of claim 12, wherein the hydrogen gas pressure is from 50 PSI to 150 PSI.

15. The method of claim 12, wherein the temperature is from 75° C. to 250° C.

16. The method of claim 1, wherein heating the first mixture comprises heating the first mixture for a time period of from 1 hour to 48 hours.

17. A method, comprising:
mixing polyvinylchloride (PVC) with
an aqueous solvent,
a catalyst selected from 5 wt % Pd on carbon, 5 wt % Pt on carbon, or dichloro(1,2-bis(diphenylphosphino)ethane)nickel, and
an amine base, to form a first mixture, the first mixture having a PVC: catalyst ratio of from 10:1 to 3:1 wt:wt; and
heating the first mixture in the presence of hydrogen gas at a pressure of from 50 PSI to 150 PSI and at a temperature of from 75° C. to 350° C., to form a second mixture comprising polyethylene.

* * * * *